US012710854B2

(12) United States Patent
Kaliyaperumal et al.

(10) Patent No.: US 12,710,854 B2
(45) Date of Patent: Aug. 18, 2026

(54) MULTI-MODAL CURSOR AND SYSTEMS FOR SWITCHING MODES OF A CURSOR

(71) Applicant: Microsoft Technology Licensing, LLC, Redmond, WA (US)

(72) Inventors: PalaniRaj Kaliyaperumal, Redmond, WA (US); Kuralmani Elango, Bothell, WA (US); Deepanjan Bhol, Kenmore, WA (US); Jennifer Janell Gregory, Bellevue, WA (US); Christina Montefalcon Ramsey, Redmond, WA (US); Juliette Danielle Weiss, Renton, WA (US); Kyle Jay Rindahl, Marysville, WA (US); Farhaz A Karmali, Redmond, WA (US); Julie Strauss, Olalla, WA (US); Per Grønvold Mikkelsen, Seattle, WA (US); Jennifer Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 18/420,380

(22) Filed: Jan. 23, 2024

(65) Prior Publication Data

US 2025/0156027 A1 May 15, 2025

Related U.S. Application Data

(60) Provisional application No. 63/548,448, filed on Nov. 14, 2023.

(51) Int. Cl.
*G06F 3/04812* (2022.01)
*G06F 3/0482* (2013.01)

(52) U.S. Cl.
CPC ........ *G06F 3/04812* (2013.01); *G06F 3/0482* (2013.01)

(58) Field of Classification Search
CPC ............. G06F 3/04812; G06F 3/04817; G06F 3/04842
See application file for complete search history.

(56) References Cited

U.S. PATENT DOCUMENTS

2016/0378294 A1* 12/2016 Wright ................ G06F 3/04815 715/851
2019/0018497 A1* 1/2019 Holz ..................... G06F 3/0304
(Continued)

OTHER PUBLICATIONS

U.S. Appl. No. 63/548,448, filed Nov. 14, 2023.
(Continued)

*Primary Examiner* — Cao H Nguyen
(74) *Attorney, Agent, or Firm* — Workman Nydegger

(57) ABSTRACT

Systems and methods are provided for managing the utilization and switching of modes for a multi-modal cursor. A user interface with selectable content is displayed, along with a cursor prompt for a multi-modal cursor. A traditional cursor mode icon and an artificial intelligence (AI) cursor mode icon are also displayed with user interface. The systems determine which mode of the multi-modal cursor to activate and utilize based on user input selecting either the traditional cursor mode icon or the AI cursor mode icon. User selection of the traditional cursor mode icon activates the first cursor mode and user selection of the AI cursor mode icon activates the second cursor mode.

19 Claims, 15 Drawing Sheets

(56) References Cited

U.S. PATENT DOCUMENTS

| | | | | |
|---|---|---|---|---|
| 2022/0198136 | A1* | 6/2022 | Peleg | G06N 3/088 |
| 2025/0156026 | A1 | 5/2025 | Kaliyaperumal | |
| 2025/0245030 | A1* | 7/2025 | Cyjon | G06F 3/04842 |

OTHER PUBLICATIONS

U.S. Appl. No. 63/548,450, filed Nov. 14, 2023.
U.S. Appl. No. 18/420,365, filed Jan. 23, 2024.
Notice of Allowance mailed on Apr. 10, 2026, in U.S. Appl. No. 18/420,365, 09 pages.

* cited by examiner

MULTI-MODAL CURSOR AND SYSTEMS FOR SWITCHING MODES OF A CURSOR

CROSS-REFERENCE TO RELATED APPLICATIONS

This application claims the benefit of U.S. Provisional Patent Application Ser. No. 63/548,448, filed on Nov. 14, 2023, entitled "MULTI-MODAL CURSOR AND SYSTEMS FOR SWITCHING MODES OF A CURSOR," and which application is expressly incorporated herein by reference in its entirety.

BACKGROUND

It would not be an overstatement to say that mouse prompts are a fundamental component of graphical user interfaces. The term mouse prompt is broadly used herein to apply to prompts that are controlled by I/O (input/output) mouse devices, but may also include prompts controlled by other types of I/O controllers, such as keyboards, cameras and gesture detection devices, voice control devices, etc.

Mouse prompts are also referred to herein as cursor prompts. These prompts are often represented by a cursor on a display screen and provide users with a means to interact with and manipulate objects, text, and other elements within the graphical user interfaces where they are displayed. The mouse prompt may take the form of a pointed arrow, a hand with a pointed finger, or another pointed structure that is moved by a controller around a user interface and which may be used to select elements displayed within the user interfaces.

Conventional functionality that can be invoked with a mouse prompt includes the selection of content that is being pointed to or encircled by the movement of the mouse prompt. Once selected, the content can be copied and pasted or moved with the mouse prompt. Other functionality can include, for example, the triggering of a browser to open of a webpage associated with a hyperlink selected by the mouse prompt.

While the mouse prompt has been a valuable tool in the realm of human-computer interaction, its limited capabilities and lack of adaptability have given rise to various shortcomings and frustrations experienced by users.

By way of example, traditional mouse prompts are typically equipped with only a very a basic set of functions, primarily limited to tasks such as selecting text or other items and triggering specific actions, such as opening files or applications. However, the mouse cursor's functions do not dynamically adjust or evolve in response to the user's evolving intentions and do not anticipate and adapt to a user's intended actions. This can sometimes lead to frustrating and non-intuitive interactions. Users may be required to navigate through a series of menus or options to execute even simple tasks, leading to inefficiencies and decreased user satisfaction.

With conventional mouse prompts, users often find themselves repeatedly moving the mouse cursor to perform multiple actions on the same object or area of the screen. This redundancy can be time-consuming and physically taxing.

Traditional mouse prompts also lack the ability to automate repetitive tasks or respond to context-specific user needs. Users are frequently compelled to perform the same sequences of actions manually, leading to inefficiency and reduced productivity.

Certain users, such as those with mobility impairments, may find traditional mouse prompts challenging to use due to their limited functionality. This can lead to accessibility issues and hinder the inclusivity of software and interfaces.

When users need to perform complex tasks that require multiple steps or a combination of interactions, the limitations of traditional mouse prompts become particularly apparent. Users may struggle to coordinate and execute a series of actions efficiently.

In light of these problems associated with the limited capabilities of traditional mouse prompts, there exists an ongoing need and desire for improved systems and methods that can be used to enhance the capabilities and functionalities provided by mouse prompts and particularly for interacting with graphical user interfaces in new and useful ways.

SUMMARY

The techniques described herein relate to computer-implemented methods and systems for managing the utilization and switching of modes for a multi-modal cursor.

In some aspects, computer-implemented processes and implementing systems are provided for managing a multi-modal cursor. These processes include displaying a user interface with one or more display blocks, each containing selectable content. A cursor prompt for a multi-modal cursor is displayed within the user interface. This multi-modal cursor is associated with a first cursor mode, which is a non-contextual functionality mode, and a second cursor mode, which is a contextual functionality-enabling mode. Both a traditional cursor mode icon and an artificial intelligence (AI) cursor mode icon are displayed within the user interface. The mode of the multi-modal cursor to activate and utilize is determined based on user input selecting either the traditional cursor mode icon or the AI cursor mode icon. User selection of the traditional cursor mode icon activates the first cursor mode and user selection of the AI cursor mode icon activates the second cursor mode.

In some aspects, the disclosed systems and methods may include one or more of the following features. The traditional cursor mode icon and the AI cursor mode icon may be displayed concurrently within the user interface. Upon detecting a user selection of the traditional cursor mode icon, the method may decide to continue displaying the cursor prompt in a first format associated with the first cursor mode without altering the presentation of the cursor prompt from the first format to a second format associated with the second cursor mode. Upon detecting a user selection of the AI cursor mode icon, the method may decide to modify the presentation of the cursor prompt from a first format associated with the first cursor mode to a presentation of the cursor prompt in a second format associated with the second cursor mode. The second format of the cursor prompt associated with the second cursor mode may comprise a second shape that is distinct from one or more first shapes of the cursor prompt associated with the first cursor mode.

In some aspects, the disclosed systems include a processor system and a computer storage medium that stores computer-executable instructions that are executable by the processor system to implement the disclosed methods and functionality for utilizing and switching modes of the disclosed multi-modal cursors.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
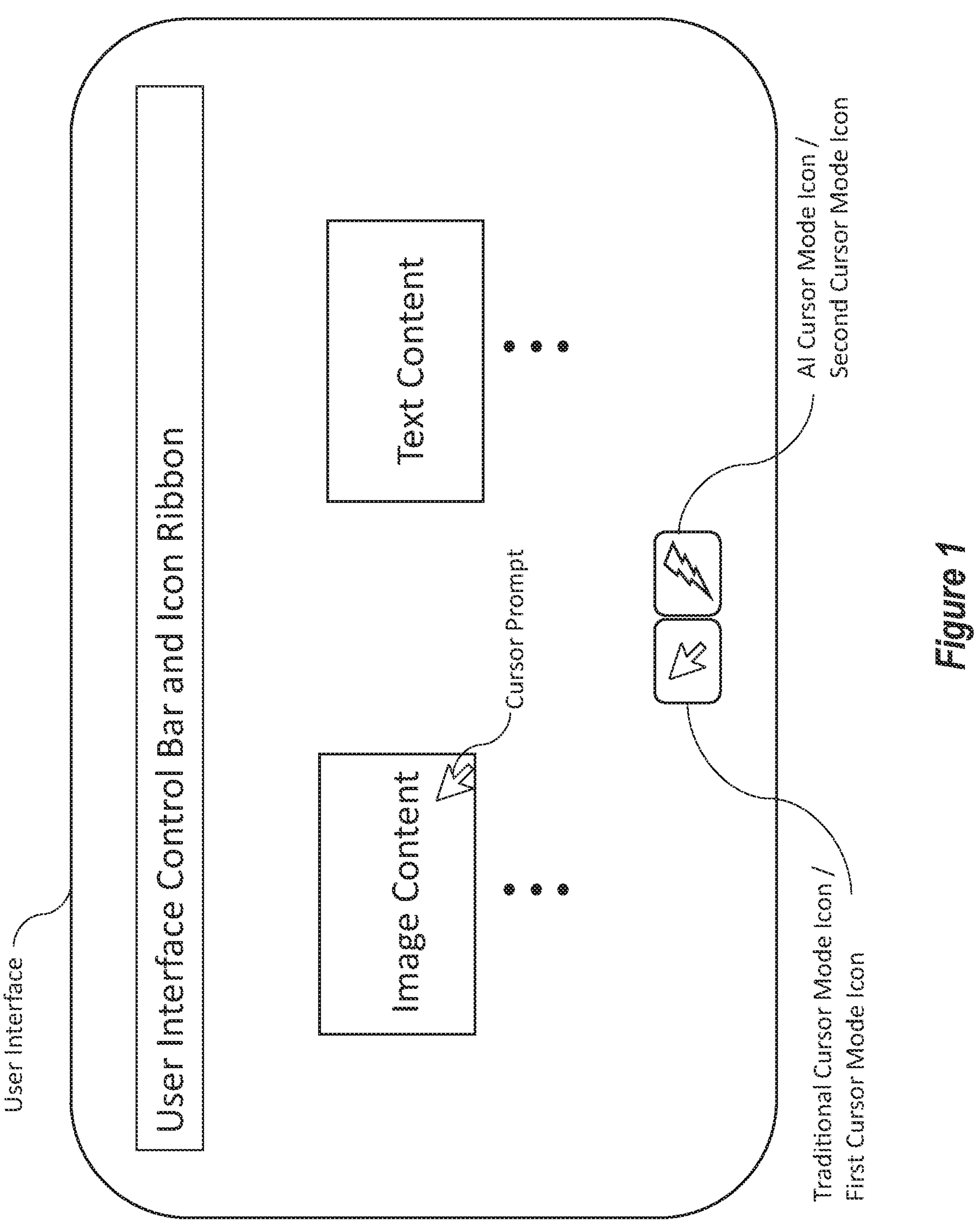
FIGS. 1-7 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

Systems and methods are provided for managing the utilization and switching of modes for a multi-modal cursor. A user interface with selectable content is displayed, along with a cursor prompt for a multi-modal cursor. A traditional cursor mode icon and an artificial intelligence (AI) cursor mode icon are also displayed with user interface. The systems determine which mode of the multi-modal cursor to activate and utilize based on user input selecting either the traditional cursor mode icon or the AI cursor mode icon. User selection of the traditional cursor mode icon activates the first cursor mode and user selection of the AI cursor mode icon activates the second cursor mode.

The disclosed embodiments include systems and methods configured for utilizing and switching modes of a multi-modal cursor applied to or otherwise associated with a cursor prompt within a user interface.

In many embodiments, a user interface is presented with one or more display blocks (also referred to as frames), each containing selectable content. The selectable content may include, but is not limited to, text, images, charts, or graphs. The user interface also presents a cursor prompt for a multi-modal cursor. This multi-modal cursor is associated with two distinct modes: a first cursor mode and a second cursor mode.

The first cursor mode is a non-contextual functionality mode. In this mode, the cursor operates in a traditional manner, allowing the user to select and/or manipulate the selectable content (e.g., select, copy, paste and sometimes edit the selected content) within the display blocks. The second cursor mode is a contextual functionality-enabling mode. This mode leverages artificial intelligence (AI) technologies to provide enhanced functionality based on the context of the user and the context of the application or user interface instance.

The context of the user can include a user position or title, historical or preference data that indicates how a user has interacted with or prefers to interact with different types of data (e.g., image data, text data, multimedia data, and other data types). The context of the user can also include a previous action, such as a previous selection of data, a navigation with the interface, opening an application, or a query submitted by a user. The context of the user can also include authorizations, subscriptions, and services associated with the user. The context of the user can also include calendar information and other personal information associated with temporal scheduling and events associated with the user. User context data may also include geographic and language preferences. User context data may also include education level, job description and financial information about the user.

The system may use the context of the user and/or the context of the application and/or interface instance when selecting a functionality from a plurality of different functionalities to apply to selected content that is selected by the cursor prompt when the cursor prompt is in the AI cursor mode, as described in more detail below. The functionality may be a functionality, for example, to contrast the selected content with other previously selected content or to apply a machine-learning model to the selected content, such as a model trained to perform a particular task.

By way of example, the selection of the content with the cursor prompt when that prompt is in the AI cursor mode may cause the system to determine to perform a translation of selected text based on a language of the user or a previously performed task (e.g., to translate a passage of selected text from one language to another language associated with the user). Another task that may be selected, by way of example, is a task to convert the selected text to audible speech with a text-to-speech model, based on context of the user, for example, or a context of the application or interface instance (e.g., a user has recently opened an application related to text-to-speech functionality). Another example includes selecting a functionality to perform a transformation on image data (e.g., modifying an image with a particular transform, to enhance a resolution or apply a filter). Another example includes determining that data should be presented in a table or chart format, or alternatively, to change the table or chart/graph format from a first format (e.g., a line chart) to a second format (e.g., a pie chart).

The system preferably identifies different functionalities that are available to the user, based on the context information referenced above. The system also identifies and selects a function from the plurality of different functions that could be applied, based on the context information and which may also include a type of content being selected, and then generates a call or command for a corresponding model or executable to be applied to the selected text to perform the selected functionality.

To enable this functionality, the system will determine a type of content that is selected in response to detecting content has been selected. The system may also identify different functions that can be performed to the detected content based on metadata and identifiers contained with or associated with the data. The system may additionally, or alternatively, periodically apply a model trained to identify content types to the different content that is presented within the user interface.

The different context information and the different tables mapping the content types and functionalities and models that may be applied to the different content types are stored within storage of the system or within an accessible storage of a remote third-party system.

Within the user interface, both a traditional cursor mode icon and an AI cursor mode icon are presented. These icons serve as visual representations of the two modes of the multi-modal cursor. The user can switch between the two modes by selecting the respective icons. Specifically, user selection of the traditional cursor mode icon activates the first cursor mode, while user selection of the AI cursor mode icon activates the second cursor mode. This allows the user to easily and quickly switch between the two modes of the multi-modal cursor, depending on their current task or preference.

The user interface provides a visual platform for the user to interact with the multi-modal cursor and the selectable content. The user interface is designed with one or more display blocks or frames that each contains different selectable content and, sometimes, content of different types (e.g., a first block/frame may include content from a first source and be of a first type, such as text, and the second block/frame may include content from a second source and be of a second type, e.g., an image type or a chart/graph type data. It will be appreciated, in this regard, the selectable content can take various forms, including but not limited to, text, images, charts, or graphs. The specific type of selectable content presented within the display blocks can vary based on the specific application or task at hand.

Within the user interface, a cursor prompt for the multi-modal cursor is presented. The cursor prompt serves as a visual representation of the multi-modal cursor, allowing the user to see where the cursor is currently positioned within the user interface. The cursor prompt can take various forms, depending on the mode of the multi-modal cursor that is currently activated. For example, in the first cursor mode, the cursor prompt may be presented in a first format, such as a traditional arrow or hand and pointed finger shape. In the second cursor mode, the cursor prompt may be presented in a second format, which could be a different shape or color to distinguish it from the first format. In one example, the shape of the second cursor mode is a shape other than an arrow or hand/finger. Such a shape may be, for example, a lightning bolt or a circle that indicates connectivity with a point extending from the circle. Other shapes may also be used.

Alternatively, the second cursor mode and the first cursor mode have a same shape, only different colors and/or sizes. For instance, the traditional first cursor mode may be associated with a solid black arrow or black-outlined arrow and the second cursor mode may be associated with a red, yellow, orange, green or other colored arrow.

In the disclosed embodiments, the user interface may also be presented with two distinct icons that are displayed within the interface: a traditional cursor mode icon and an AI cursor mode icon. These icons may be displayed along a bottom boundary of the interface, within the control/menu ribbon of the interface, or at other location. These icons serve as visual indicators of the two modes of the multi-modal cursor. The traditional cursor mode icon represents the first cursor mode, the non-contextual functionality mode. The AI cursor mode icon, on the other hand, represents the second cursor mode, the contextual functionality-enabling mode. Both icons are presented simultaneously within the user interface, allowing the user to easily switch between the two modes of the multi-modal cursor by selecting the respective icon.

The determination of which mode of the multi-modal cursor to activate and utilize is based on user input. Specifically, the user can select either the traditional cursor mode icon or the AI cursor mode icon within the user interface to activate the respective mode of the multi-modal cursor. This selection process provides the user with control over the functionality of the cursor, allowing them to switch between modes as desired or as the task at hand requires.

When the user selects the traditional cursor mode icon, the first cursor mode, or the non-contextual functionality mode, is activated. In this mode, the cursor operates in a traditional manner, allowing the user to select and manipulate the selectable content within the display blocks. The cursor prompt is presented in a first format associated with this mode, providing a visual indication of the active mode to the user.

On the other hand, when the user selects the AI cursor mode icon, the second cursor mode, or the contextual functionality-enabling mode, is activated. This mode leverages AI technologies to provide enhanced functionality based on the context of the user's actions and the instance of the user interface.

In some instances the cursor prompt changes to a second format associated with the activated mode, which may be a different shape or color to distinguish it from the first format and which may correspond to the shape and/or coloring of the displayed cursor mode icons. This change in the presentation of the cursor prompt provides a visual cue to the user that the second cursor mode has been activated.

Likewise, in some instances, the icon associated with a currently activated cursor mode is highlighted or visually distinguished with a change in size, animation, coloring, or other feature to reflect the currently active mode of the cursor prompt. Alternatively, the cursor associated with the inactive mode of the cursor prompt may be de-emphasized by reducing a size of the icon, or increasing a transparency of the icon.

As just generally described, the system enables a user to selectively switch which cursor mode is used to interact with selected content in the user interface.

In the first cursor mode, or the non-contextual functionality mode, a user input selection of content with the cursor prompt triggers traditional cursor actions. For example, the user input may cause the cursor to select and highlight the selectable content. This highlighted content can then be used for a subsequent copy function, allowing the user to easily copy the content and paste it elsewhere within the user interface or in another application. Alternatively, the user input may trigger a display of a menu associated with functions that can be performed by an application associated with the user interface with the selected content. This menu may include options such as cut, copy, paste, delete, or other functions, providing the user with a range of actions that they can perform on the selected content.

In contrast, in the second cursor mode, or the contextual functionality-enabling mode, the system determines a context associated with an instance of the user interface and a context of the user for the content being selected by the cursor prompt. This context determination process is a central aspect of the enhanced functionality provided by the second cursor mode. The context associated with an instance of the user interface may include various factors, such as the type of selectable content presented within the display blocks, the location of the multi-modal cursor within the user interface, the applications that are accessible to the user through the interface, and the functions that can be applied from these applications to the selectable content. The context of the user, on the other hand, may include factors such as the user's previous actions, preferences, or other user-specific information.

Based on the determined context, the system determines one or more contextual functions to enable when the cursor prompt is in the second cursor mode. These contextual functions are functions that are relevant to the current context, providing enhanced functionality that is tailored to the user's current task or preference. The determination of the one or more contextual functions to enable is based on the context associated with the instance of the user interface and/or the context of the user. This context-aware functionality allows the cursor to adapt its behavior and provide functions that are relevant to the current context, thereby enhancing the user's interaction with the user interface and the selectable content within it.

For example, if the context determination process determines that the user is currently working on a text document and the cursor is positioned over a piece of text, the system may enable a contextual function that allows the user to perform text-related actions, such as formatting the text or checking the spelling. On the other hand, if the context determination process determines that the user is currently viewing an image and the cursor is positioned over the image, the system may enable a contextual function that allows the user to perform image-related actions, such as zooming in on the image or applying a filter. In this way, the system provides a dynamic and context-aware user experience, allowing the user to interact with the user interface and the selectable content in a more intuitive and efficient manner.

Upon a subsequent user input selection made of the selectable content with the cursor prompt, different actions are triggered depending on whether the cursor prompt is in the first cursor mode or the second cursor mode. This dynamic response to user input enhances the flexibility and adaptability of the multi-modal cursor, allowing it to provide a user experience that is tailored to the user's current task or preference.

This ability to switch between the two modes of the multi-modal cursor based on user input provides the user with flexibility and control over their interaction with the user interface and the selectable content. It allows the user to choose the mode that is more suitable for their current task or preference, enhancing the user's experience and efficiency in interacting with the user interface.

FIGS. 1-7 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

For instance, FIG. 1 illustrates a user interface (or more simply "interface") with an interface control bar/icon ribbon that typically includes icons that can be selected to open corresponding menus or tools and/or to invoke certain functionality. The interface also displays different blocks or frames with different types of selectable content. In this image, a block of selectable image content is provided, as is a block of selectable text content.

The interface also includes a cursor prompt that may be controlled by a mouse or other I/O device to select and interact with the selectable content presented in the different blocks of the interface.

The cursor prompt may be displayed in different formats according to different corresponding cursor modes, as described. The different cursor modes can be selected and switched between in response to user selection of cursor mode icons displayed with the interface. In this embodiment, the cursor mode icons include a traditional or first cursor mode icon, as well as an AI or second cursor mode icon. In this image, the first cursor mode icon has a shape of an arrow and the second cursor mode icon has the shape of a lightning bolt.

Figure 2:
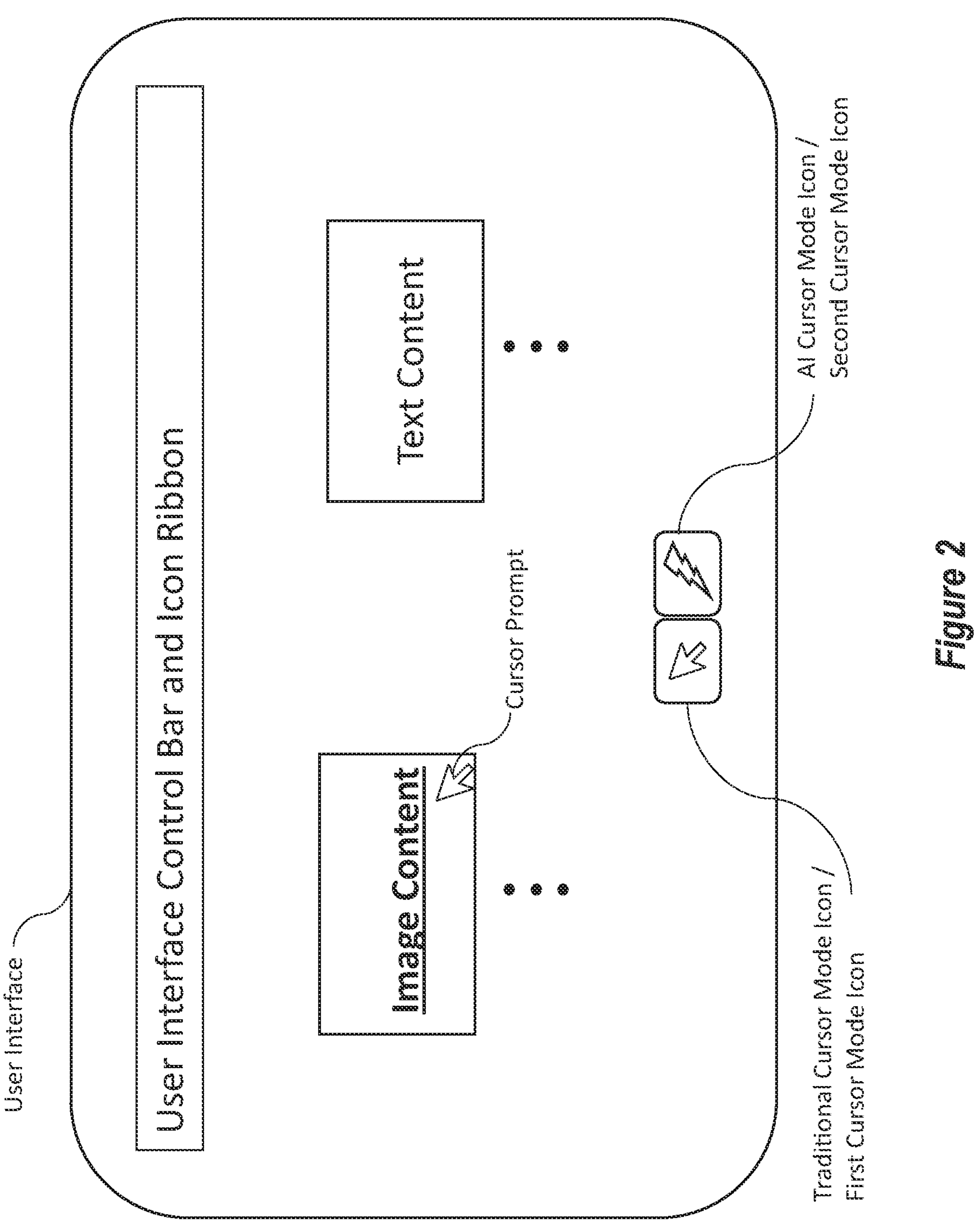

In FIG. 2, when the user selects image content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The image content is bolded in this illustration to show it has been selected.

Figure 3:
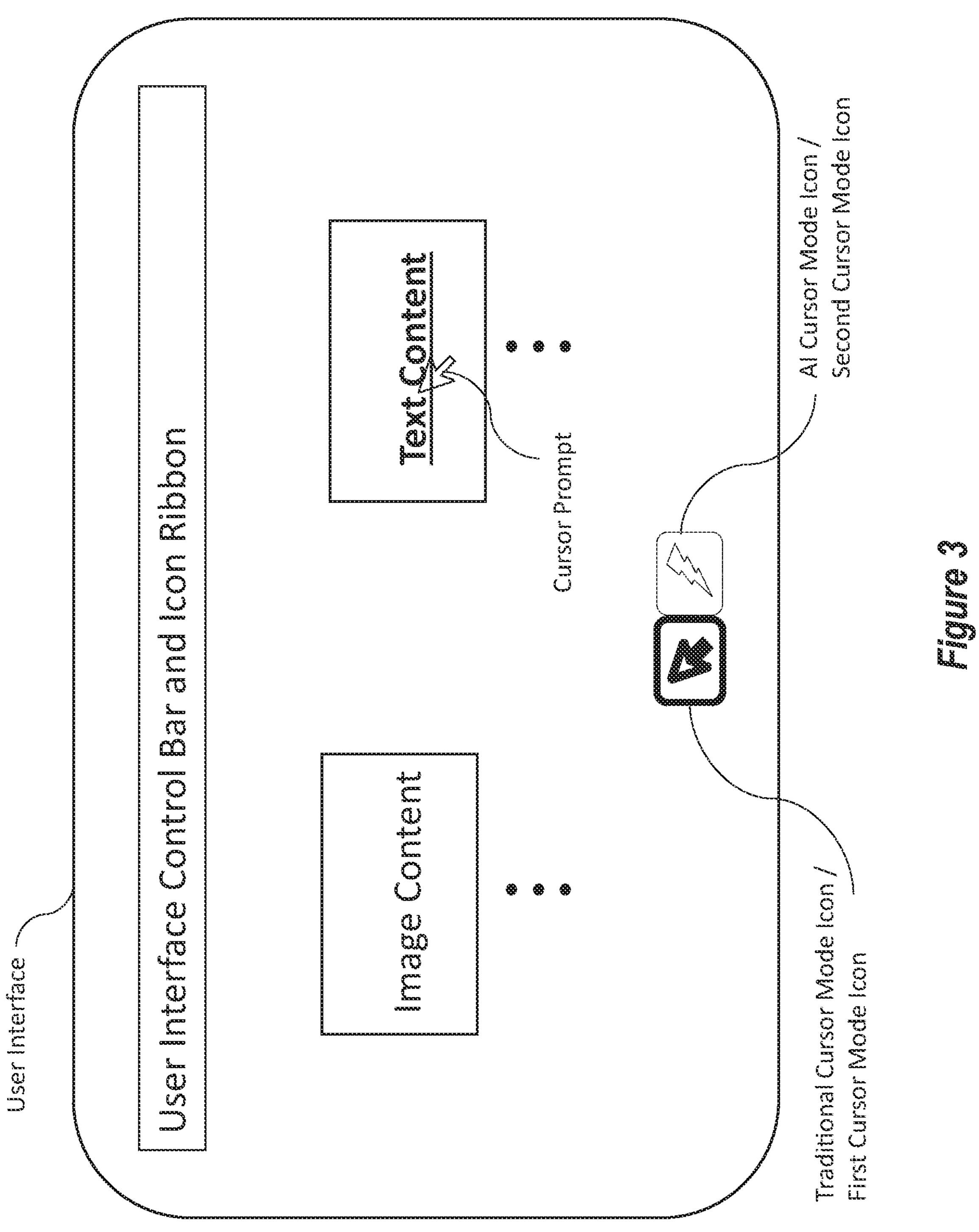

Similarly, in FIG. 3, when the user selects text content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The text content is bolded and underlined in this illustration to show it has been selected.

In FIG. 3, the active mode of the cursor causes the corresponding cursor icon to be visually emphasized and the cursor icon of the inactive cursor mode to be relatively and visually de-emphasized.

Figure 4:
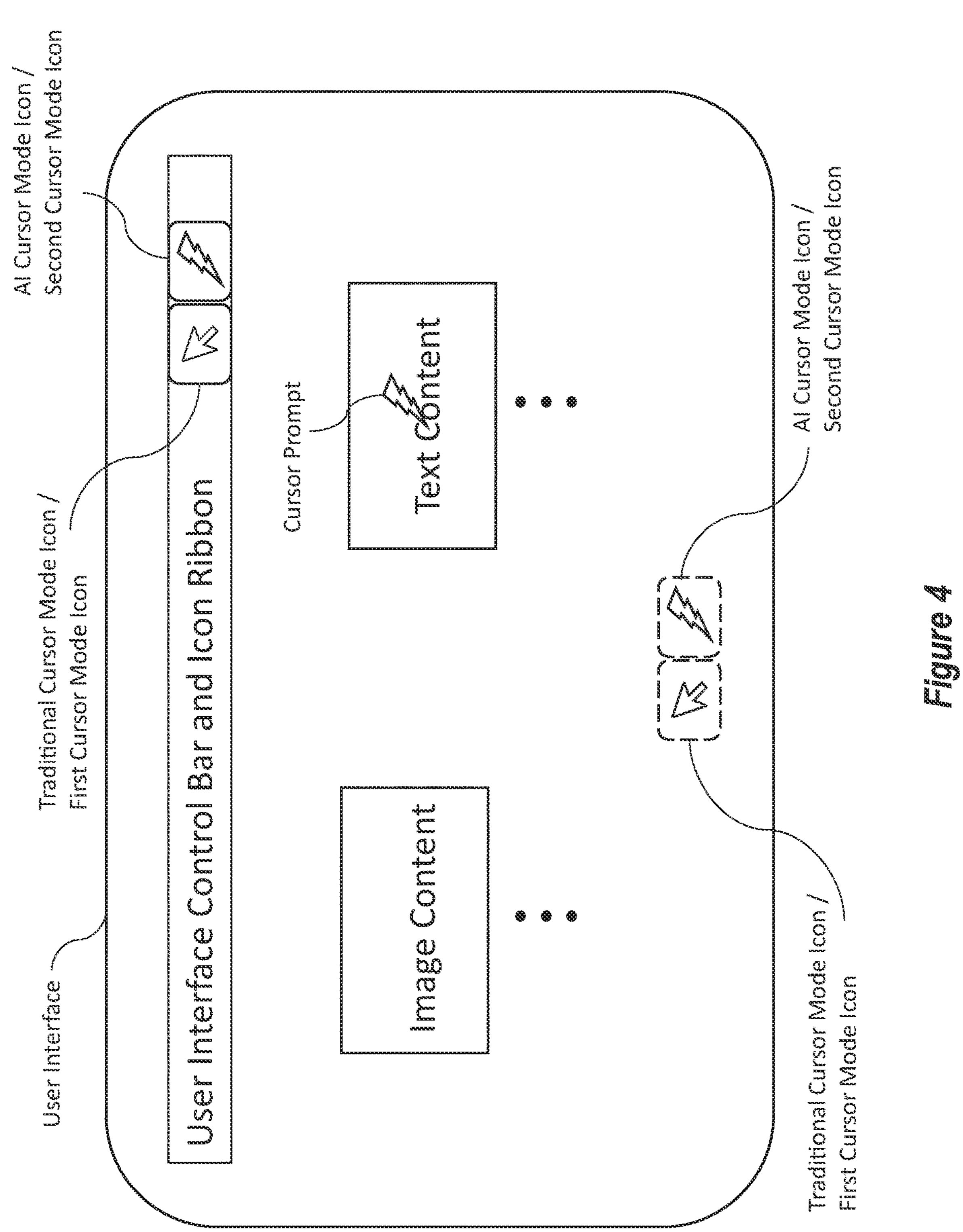

FIG. 4 illustrates how the cursor icons can be displayed at the bottom of the interface or up in the user interface control bar and icon ribbon. They can also be displayed at other locations in the interface. In some instances, not shown, only the cursor icon of the cursor mode that is currently active is displayed, while the other cursor icon of the inactive cursor mode is omitted or hidden from the interface.

In this embodiment, the active cursor mode is the AI or second cursor mode, such that the corresponding cursor prompt is displayed with a matching symbol/object.

Figure 5:
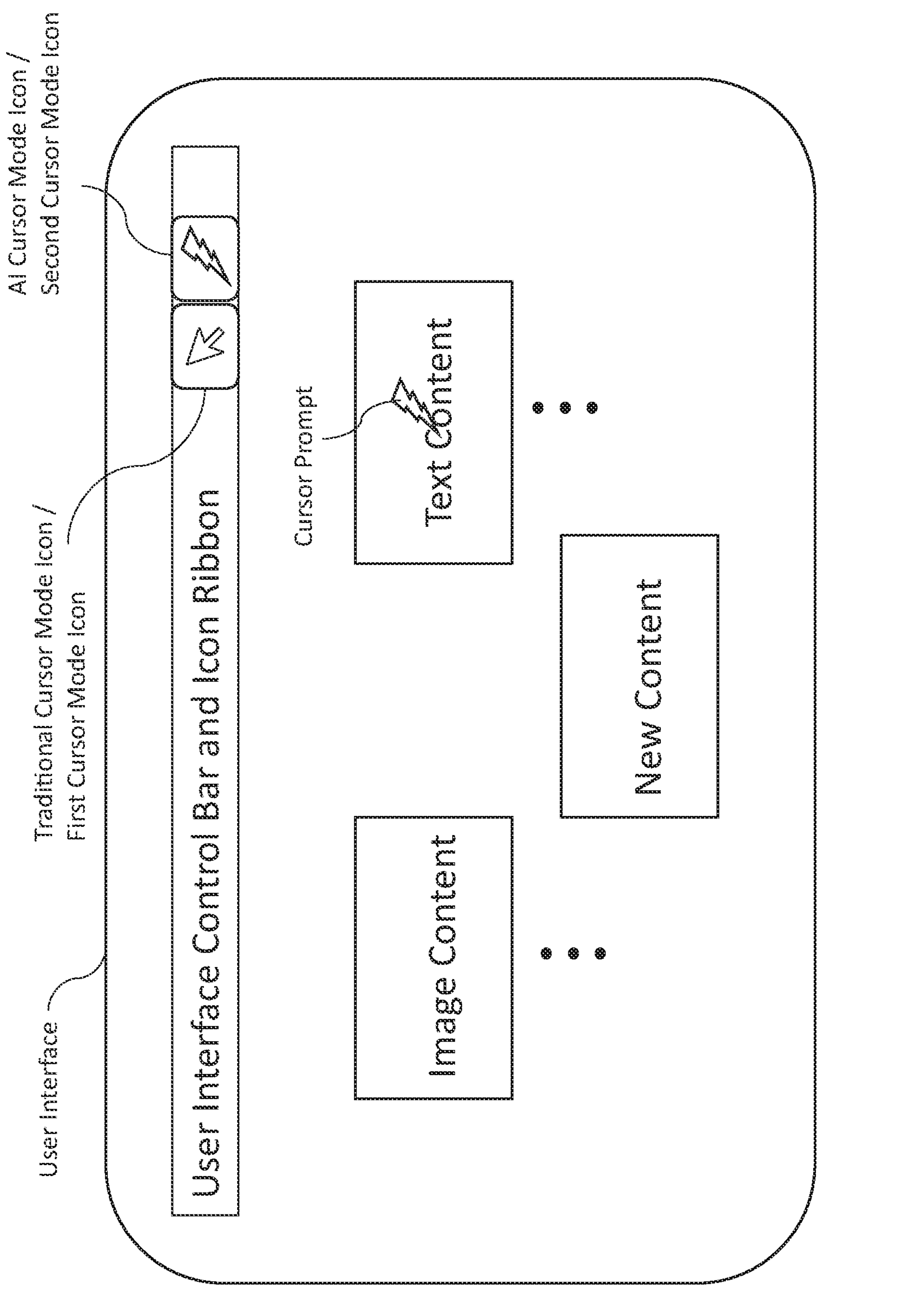

FIG. 5 illustrates how selection of the text content from FIG. 4 with the cursor prompt while in the AI or second cursor mode, or more particularly the cursor/cursor state associated with the cursor prompt is in the AI or second cursor mode, then the system will cause a selected function and corresponding model or executable to be applied to the selected content to generate new content that is displayed in the interface with the selected content (FIG. 5).

Figure 6:
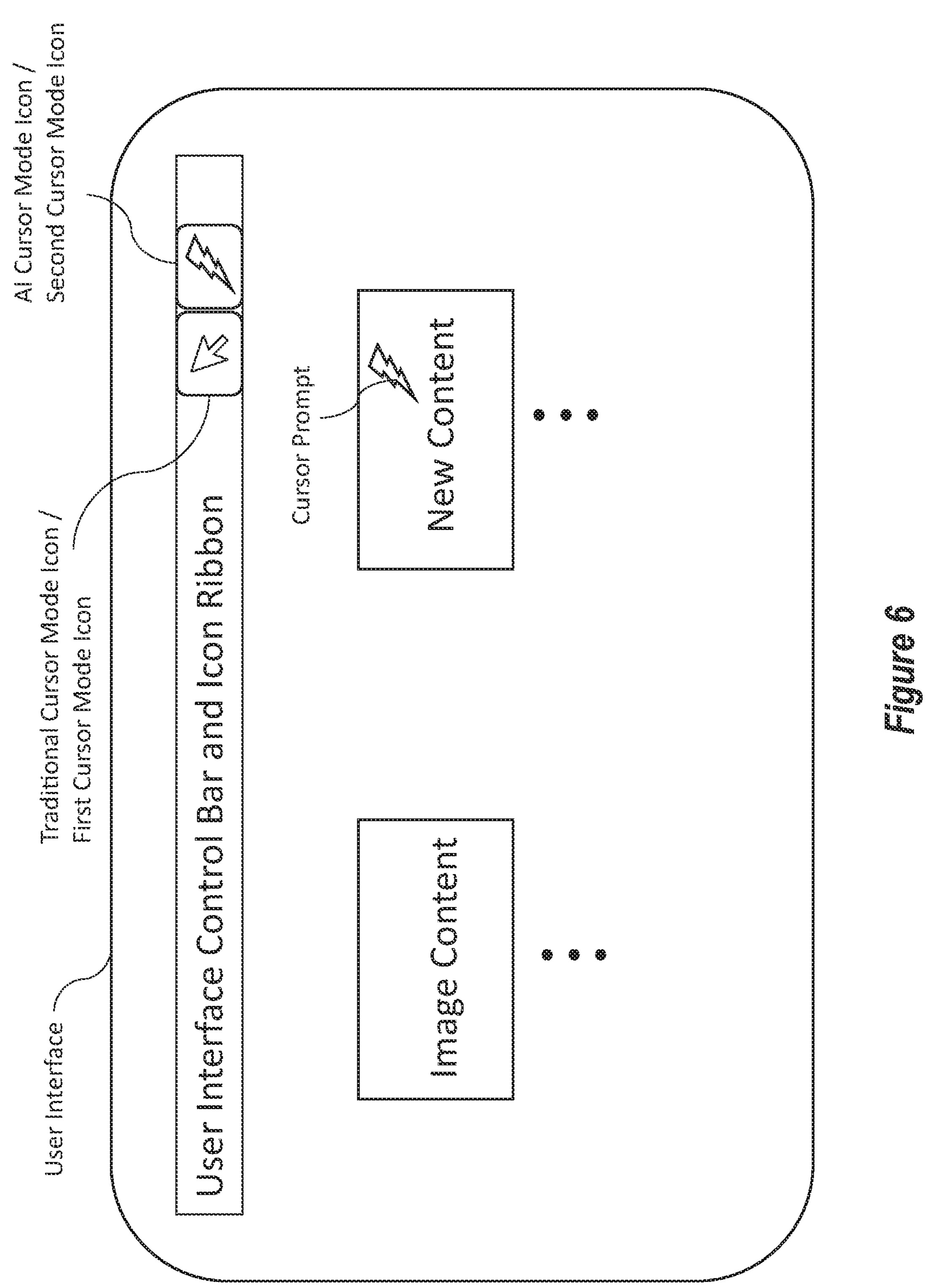
Figure 7:
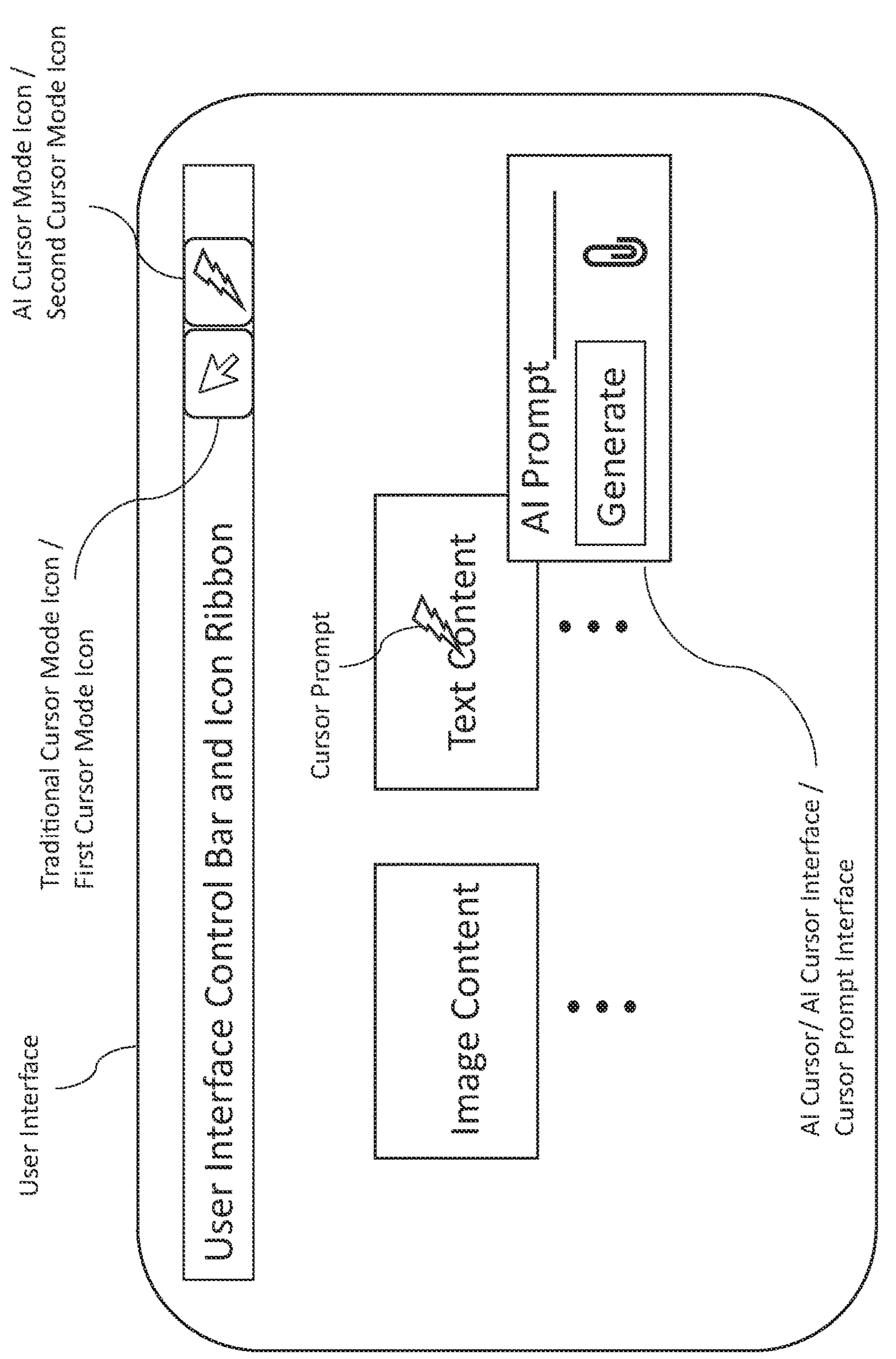

Additionally, or alternatively, this selection may also cause the system to select one or more functions to perform a transformation of the selected content into new content that replaces the selected content (FIG. 6).

In another example, the selection of the content causes the generation of an AI cursor widget (referred to herein as simply an AI cursor) that includes one or more interactive AI tools. These tools may include, for example, an AI prompt field to receive a prompt which, when populated, causes the entered prompt to be submitted to an LLM (large language mode), such as a GPT (generative predictive text) model or another model that processes the prompt to generate output that is rendered at the interface. The AI tools may also include an attachment icon or control which, when selected, provides the user options to attach one or more files to be considered and processed by the model as a stand-alone prompt or with the entered prompt. The AI tools may also include a selectable object (e.g., generate icon) which, when selected, provides options to the user for generating charts, comparisons, derivative content, and/or other processed outputs related to the selected content.

Notably, in each of these examples, the system considers a context of the user and/or application instance (which may comprise the selected content and content type) when selecting a function (e.g., executable) and/or model from a plurality of different functions that the system has access to and that can be applied to the selected content.

FIGS. 8-13 illustrate additional examples of user interfaces with components of a multi-modal cursor. In these examples, the AI or second cursor mode icon is presented as a circle with a small arrow protruding from the circle. The traditional or first cursor mode icon is presented as a traditional arrow icon.

Figure 8:
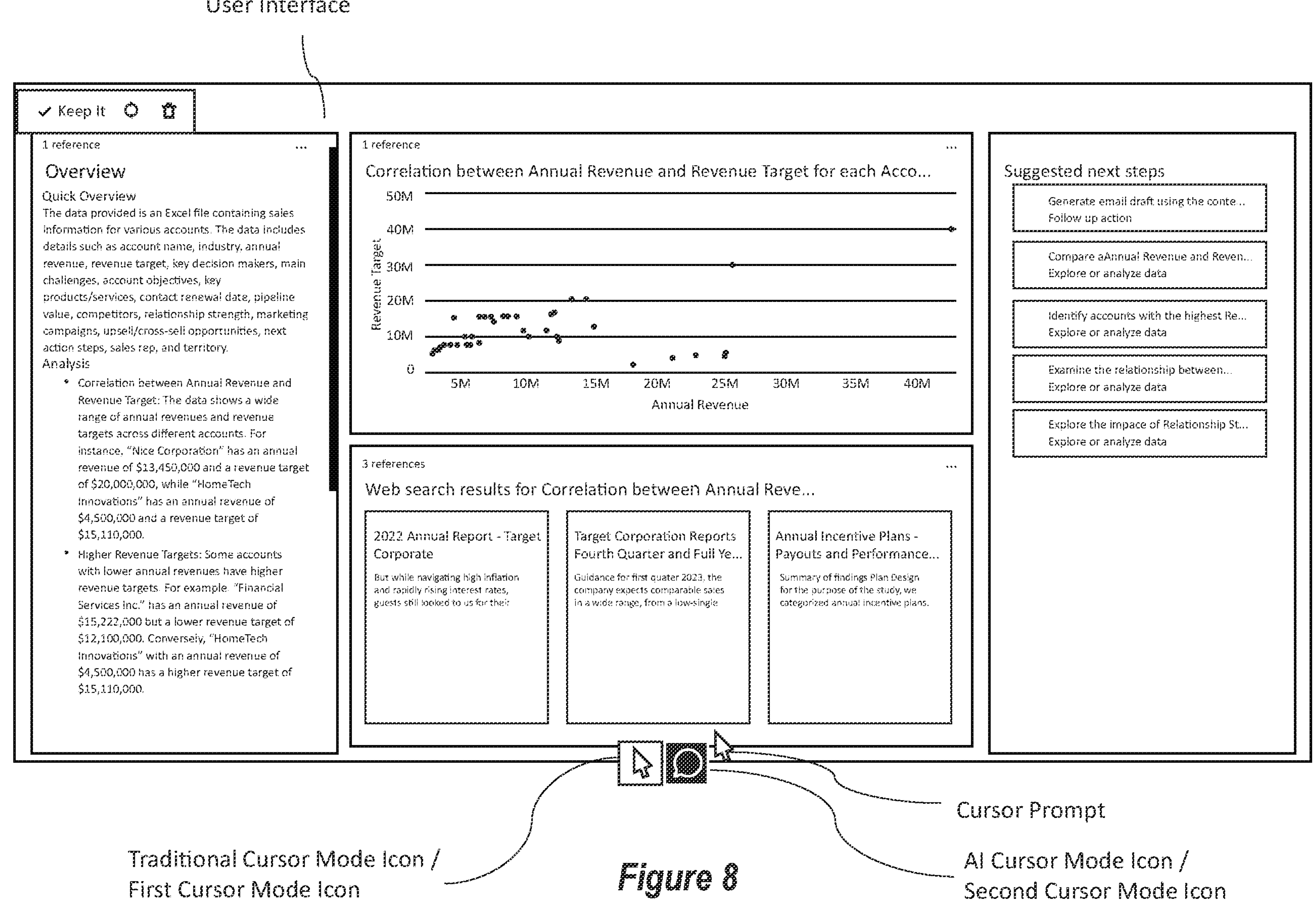
FIGS. 8-13 illustrate additional examples of user interfaces with components of a multi-modal cursor.
Figure 9:
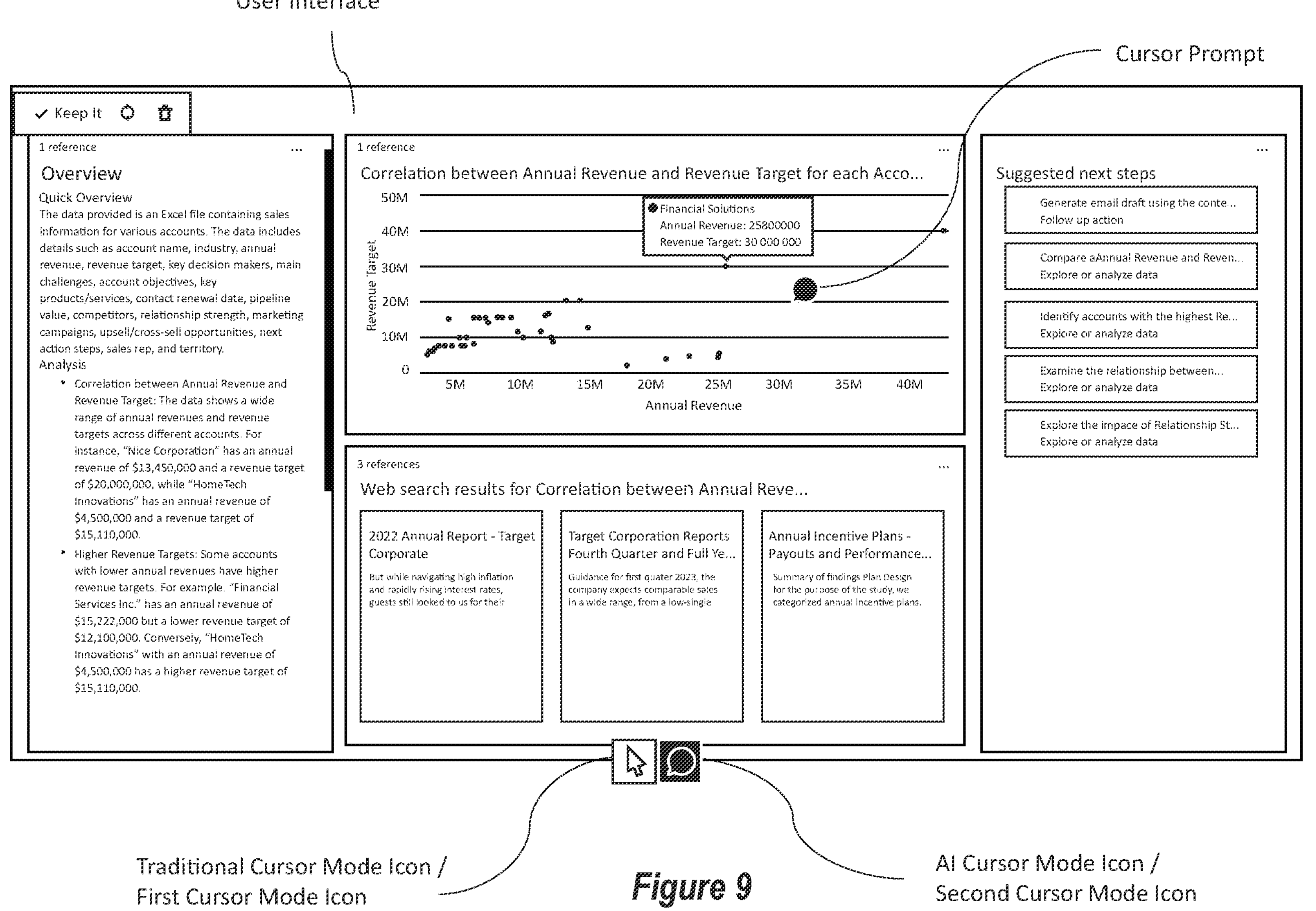
Figure 10:
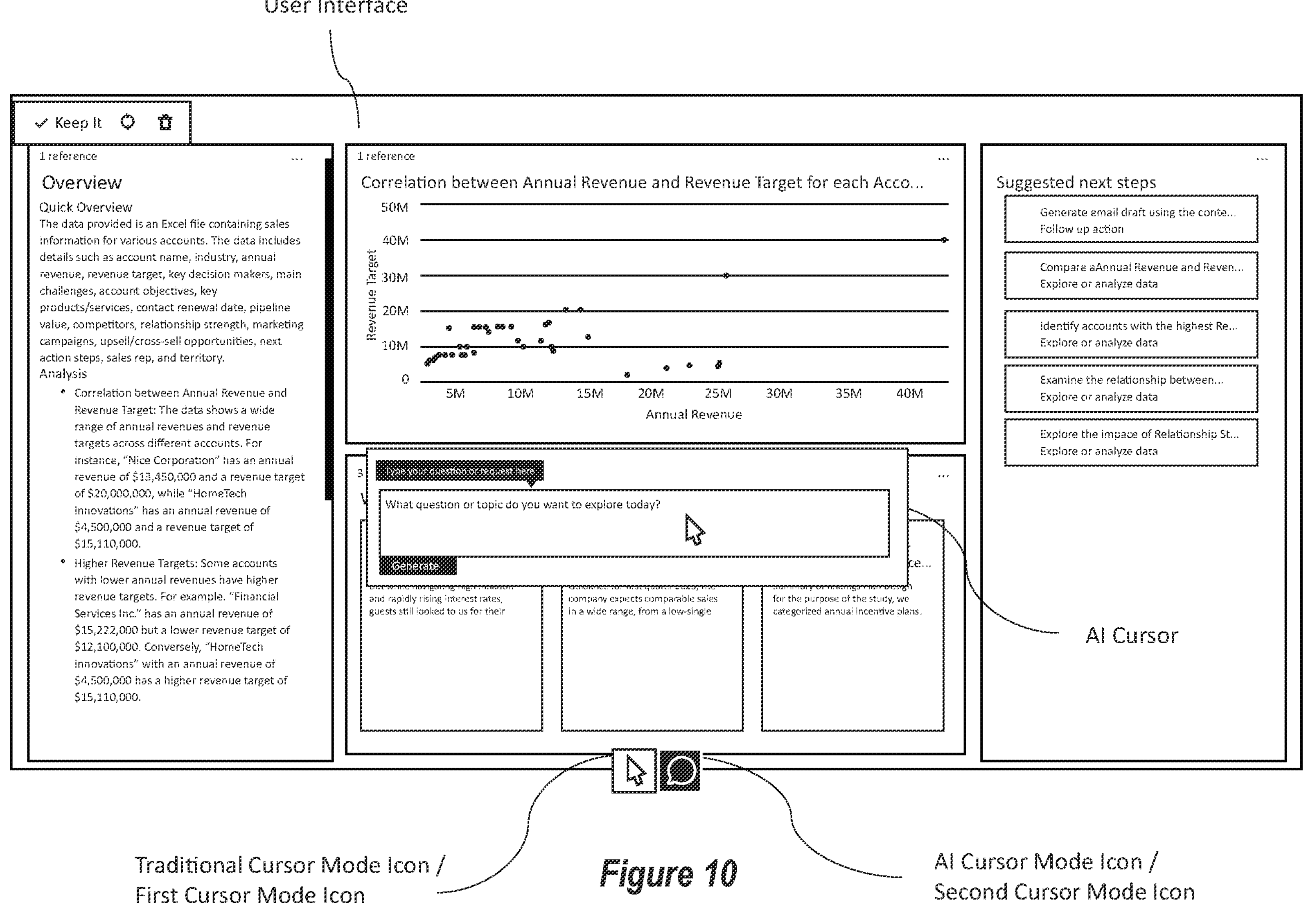
Figure 12:
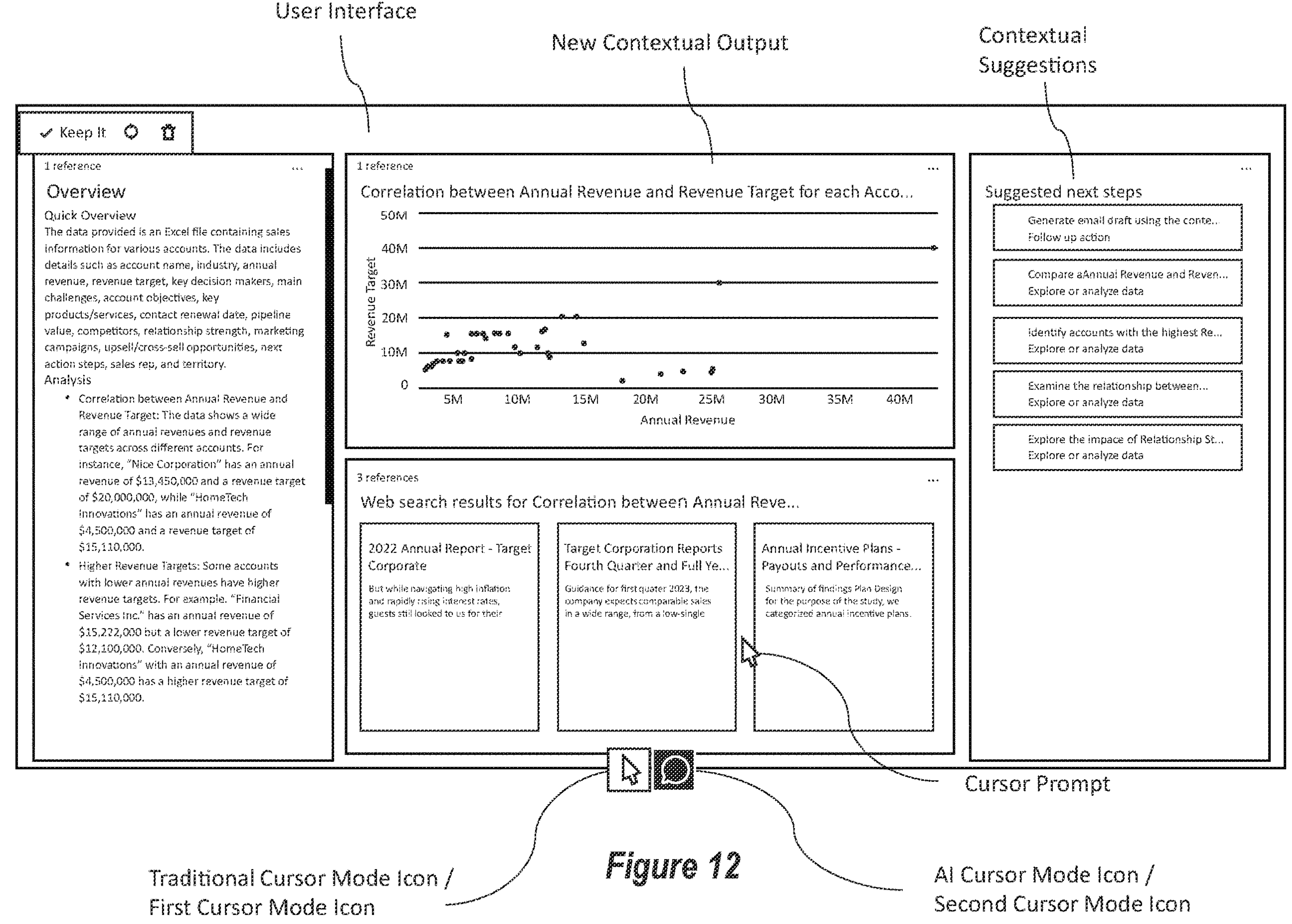

These illustrations also show different types of content presented in different blocks of the user interface, along with a cursor prompt. In FIG. 8, the cursor prompt is the shape of an arrow, corresponding to a selected state of the cursor and the corresponding first cursor mode icon. In FIG. 9, the cursor prompt is the shape of a modified circle with a point/arrow, corresponding to a selected state of the cursor and the corresponding second cursor mode icon. In FIG. 12, the cursor prompt is the shape of an arrow, corresponding to a selected state of the cursor and the corresponding first cursor mode icon.

Figure 11:
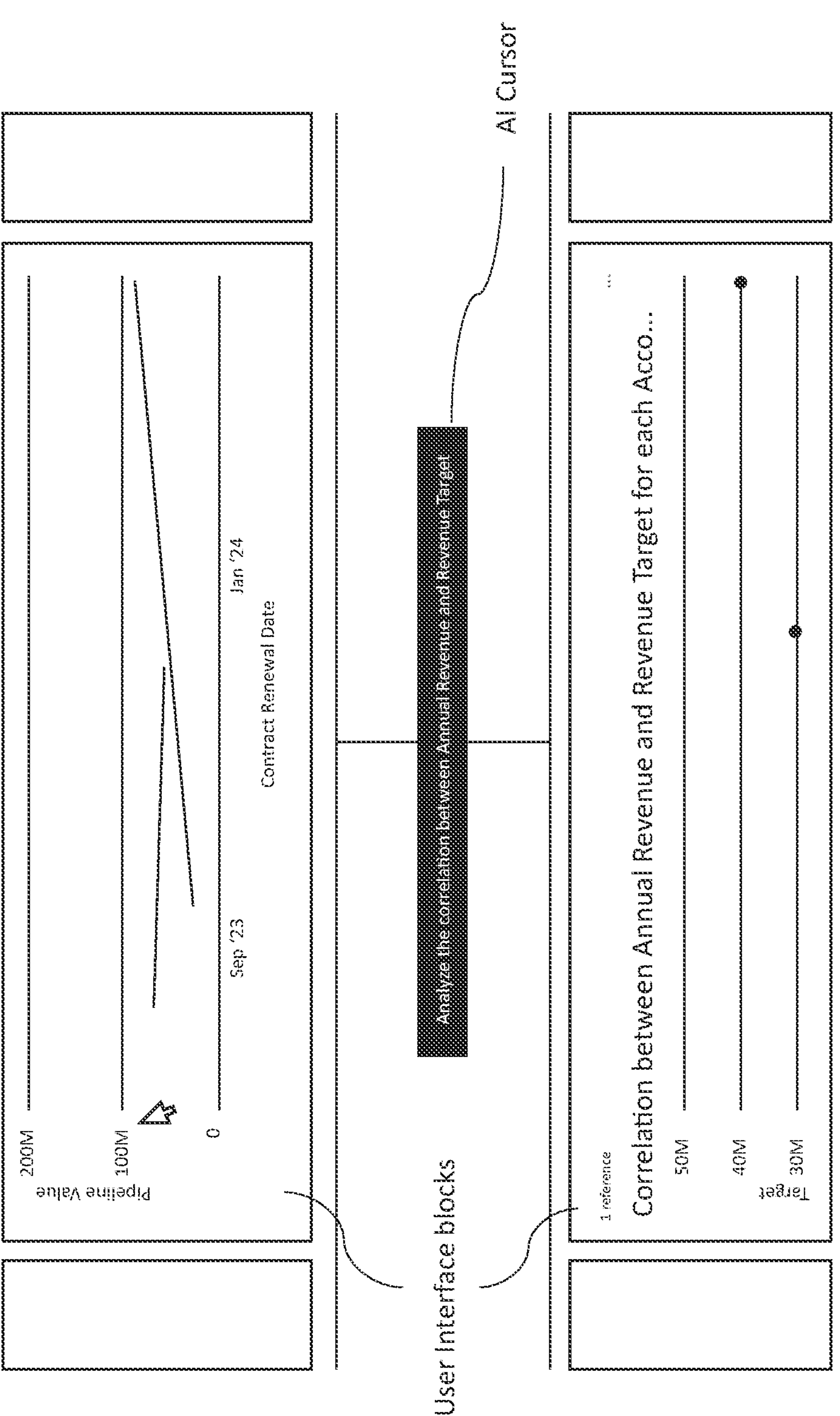

In FIG. 11 the system has received the selection of two different blocks of the interface with the cursor prompt while the second cursor mode state is activated. This caused an AI cursor interface to be displayed with interactive AI tools for processing the content of the selected interface blocks (not shown). As a result of a user selection of an AI tool for causing a comparison of selected content (not shown) or in response to a user typing a prompt, the AI cursor interface is changed to reflect the prompt/functionality to be applied to the content in the selected interface blocks (i.e., an analysis of correlations between annual revenue and revenue targets identified within the selected interface blocks).

The selection of this functionality may be based on considerations of the interface context (e.g., the content being displayed and selected) and/or based on the user context (e.g., the role/title of the user as an accountant for the company and/or a detected event to submit a report on the correlations between annual revenue and revenue targets as identified from the user's stored and referenced calendar event data and/or meeting notes).

Figure 13:
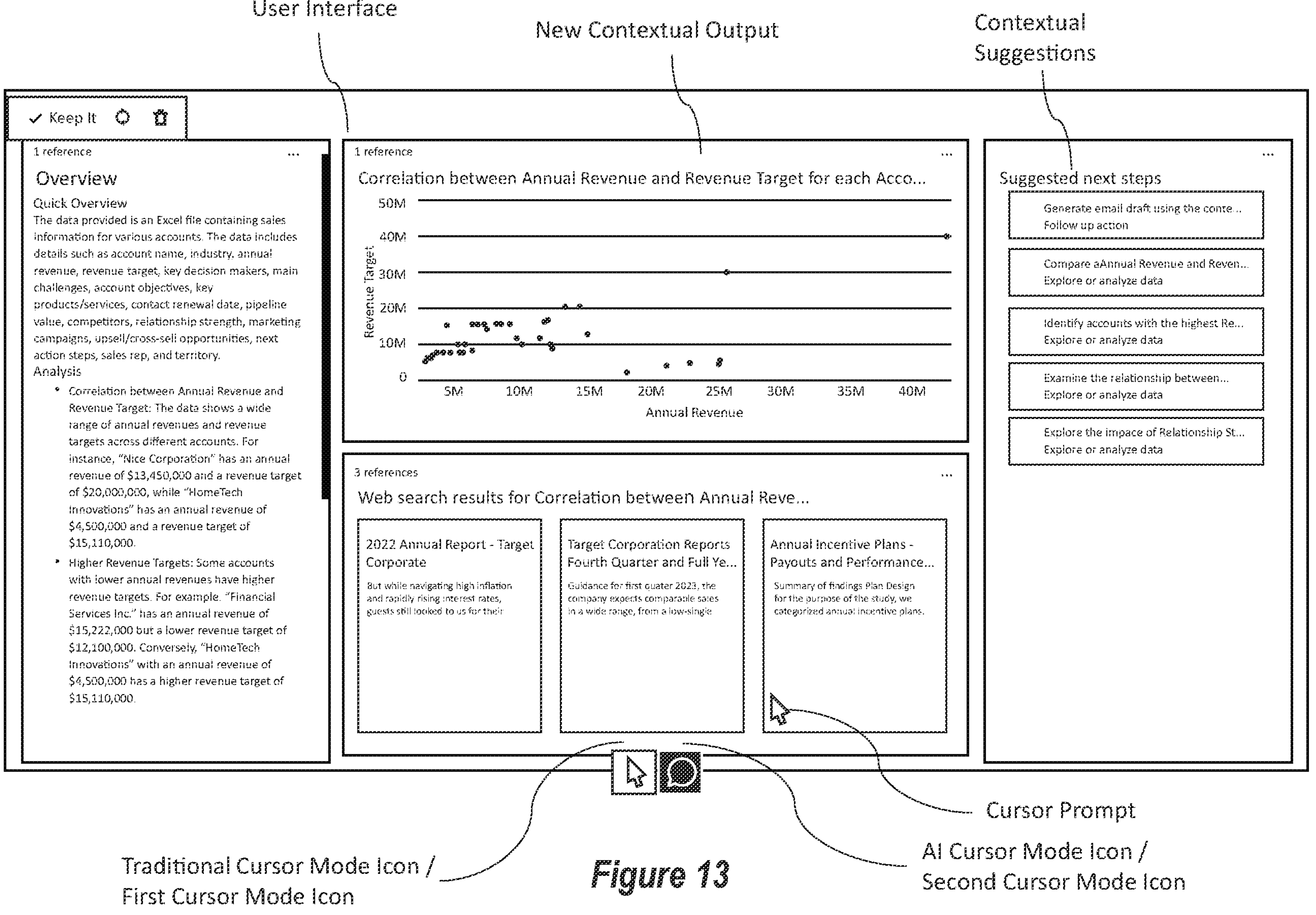

FIGS. 12 and 13 illustrate how the system, after generating the correlation output, may generate it as a new chart, comprising new contextual output, relative to what was shown in FIG. 11. The interface may also, responsively, present additional functions or suggestions that can be applied to the same data or other data corresponding to detected contexts. This set of contextual suggestions may be dynamically updated periodically and/or in response to detected actions by the user and/or in response to new detected contexts.

In FIGS. 12 and 13, the user has subsequently provided new input for selecting the traditional cursor mode icon. This causes the system to activate the first cursor mode and deactivate the second cursor mode. In FIG. 13, this causes the cursor prompt to change into a matching arrow symbol. In FIG. 12, the cursor prompt is changed to a hand. The shape/symbol used for the cursor prompt for each of the first and second cursor modes may be based on preference settings or parameters set by the user through an interface menu (not shown).

The state of the cursor/cursor mode and preferences for the cursor mode prompts may be stored in storage of the system and referenced when user input is received at the interface to ensure the proper cursor mode functionality is applied.

Figure 14:
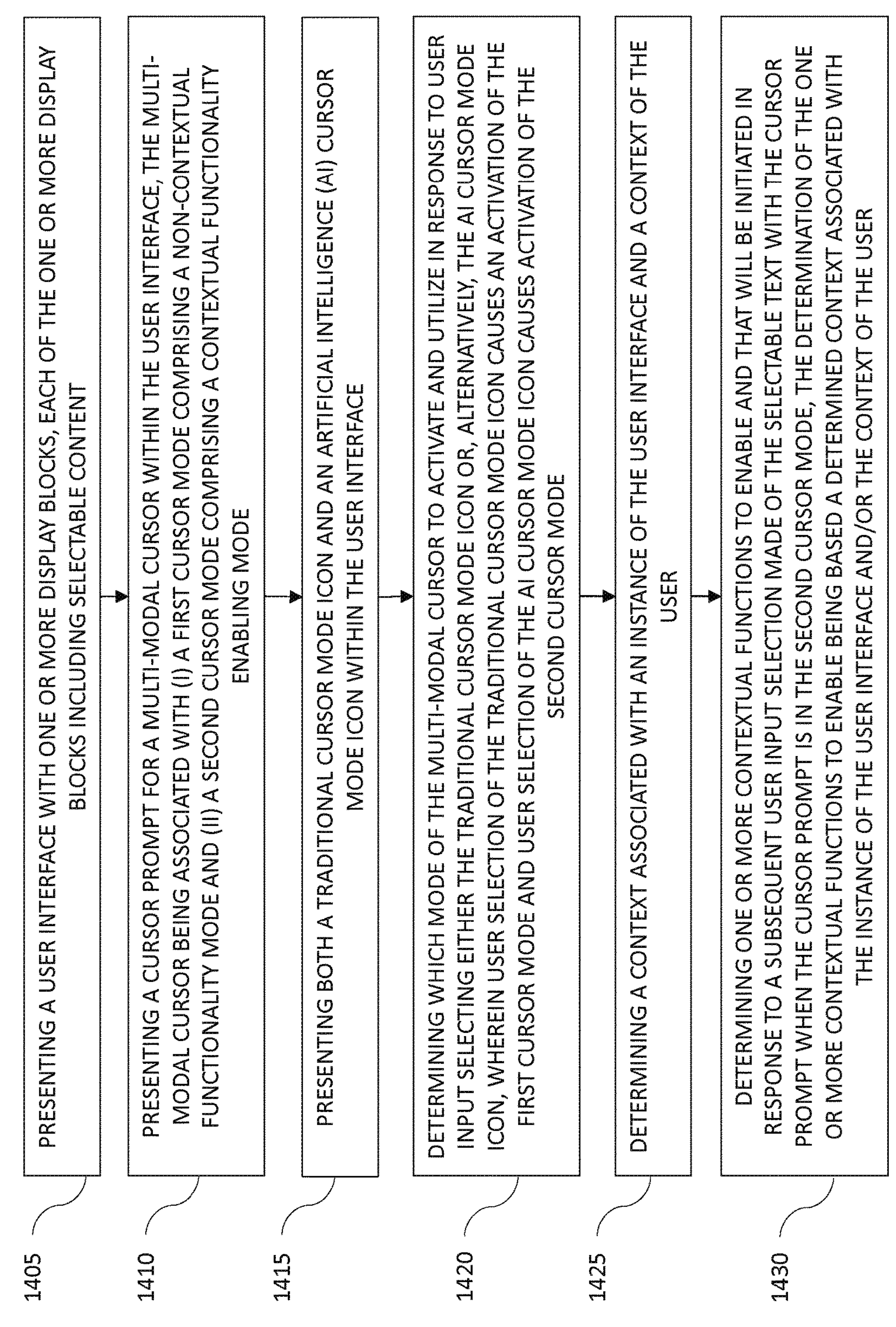
FIG. 14 illustrates an example flow chart of exemplary methods for utilizing and switching between modes of a multi-modal cursor.

FIG. 14 illustrates an example flow chart 1400 of acts associated with exemplary methods for utilizing and switching between modes of a multi-modal cursor.

As shown, the methods of the invention include presenting a user interface with one or more display blocks, each of the one or more display blocks including selectable content (act 1405), as well as presenting a cursor prompt for a multi-modal cursor within the user interface, the multi-modal cursor being associated with (i) a first cursor mode comprising a non-contextual functionality mode and (ii) a second cursor mode comprising a contextual functionality-enabling mode (act 1410).

The methods also include presenting both a traditional cursor mode icon and an artificial intelligence (AI) cursor mode icon within the user interface (act 1415) and determining which mode of the multi-modal cursor to activate and utilize in response to user input selecting either the traditional cursor mode icon or, alternatively, the AI cursor mode icon, (act 1420), wherein user selection of the traditional cursor mode icon causes an activation of the first cursor mode and user selection of the AI cursor mode icon causes activation of the second cursor mode.

In some instances, the traditional cursor mode icon and the artificial intelligence (AI) cursor mode icon are presented simultaneously within the user interface.

The format of the cursor prompt associated with the first and second cursor modes may the same or different shapes and colors.

In some instances, the methods further include detecting a user selection of the traditional cursor mode icon and determining to continue presenting the cursor prompt in a first format associated with the first cursor mode without changing a presentation of the cursor prompt from the first format to a second format associated with the second cursor mode.

The methods may also include detecting a user selection of the AI cursor mode icon and determining to change a presentation of the cursor prompt from a first format associated with the first cursor mode to a presentation of the cursor prompt in a second format associated with the second cursor mode.

In some instances, the methods further include determining a context associated with an instance of the user interface and a context of the user (act 1425) and determining one or more contextual functions to enable and that will be initiated in response to a subsequent user input selection made of the selectable text with the cursor prompt when the cursor prompt is in the second cursor mode, the determination of the one or more contextual functions to enable being based a determined context associated with the instance of the user interface and/or the context of the user (act 1430).

Notably, the subsequent user input selection may cause different actions to be triggered depending on whether the cursor prompt is in the first cursor mode or the second cursor mode. Accordingly, the method may further include: (i) in response to detecting the subsequent user input selection with the cursor prompt while the cursor prompt is in the first cursor mode, causing the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, causing the subsequent user input to trigger an interaction with a machine learning model to perform a function associated with the selectable content wherein a selection of the function from a set of different functions is based at least in part on the determined context associated with the instance of the user interface and/or the context of the user.

The content that is selected by the cursor prompt can be any selectable content, such as selectable text content, selectable images, or image content and/or selectable charts, graphs, tables, or other types of such content.

The system may determine the context associated with the instance of the user interface by determining a content type of the selectable content presented within the one or more display blocks and/or by determining a location of the multi-modal cursor within the user interface.

The context can also be a user context determined by the system analyzing user profile, preference, and historical use data. This may also include determining one or more applications that are accessible to the user (including determining application authorizations associated with the user) through the interface and one or more functions that can be applied from the one or more applications to the selectable content.

Disclosed methods may also include displaying a machine-learning model prompt field configured to receive a prompt that the machine-learning model is applied to in response to the prompt being entered into the machine-learning model prompt.

The system is configured to cause the machine-learning model to be applied to both the prompt and the selectable content to generate a response based on the prompt and the selectable content, as well as to cause the response to be displayed in the user interface.

The processed content or the response to the processed content may be displayed in replacement of the selected prompt and/or in a different location on the interface than the selected content and/or simultaneously with the selected content.

After the cursor prompt is in a particular selected cursor state, the system is configured to (i) detect new input selecting the traditional cursor mode icon after the second cursor mode was activated and, responsively, deactivating the second cursor mode and activating the first cursor mode for the cursor prompt, as well as to (ii) detect new user input selecting the AI cursor mode icon after the first cursor mode was activated and, responsively, deactivating the first cursor mode and activating the second cursor mode for the cursor prompt.

Figure 15:
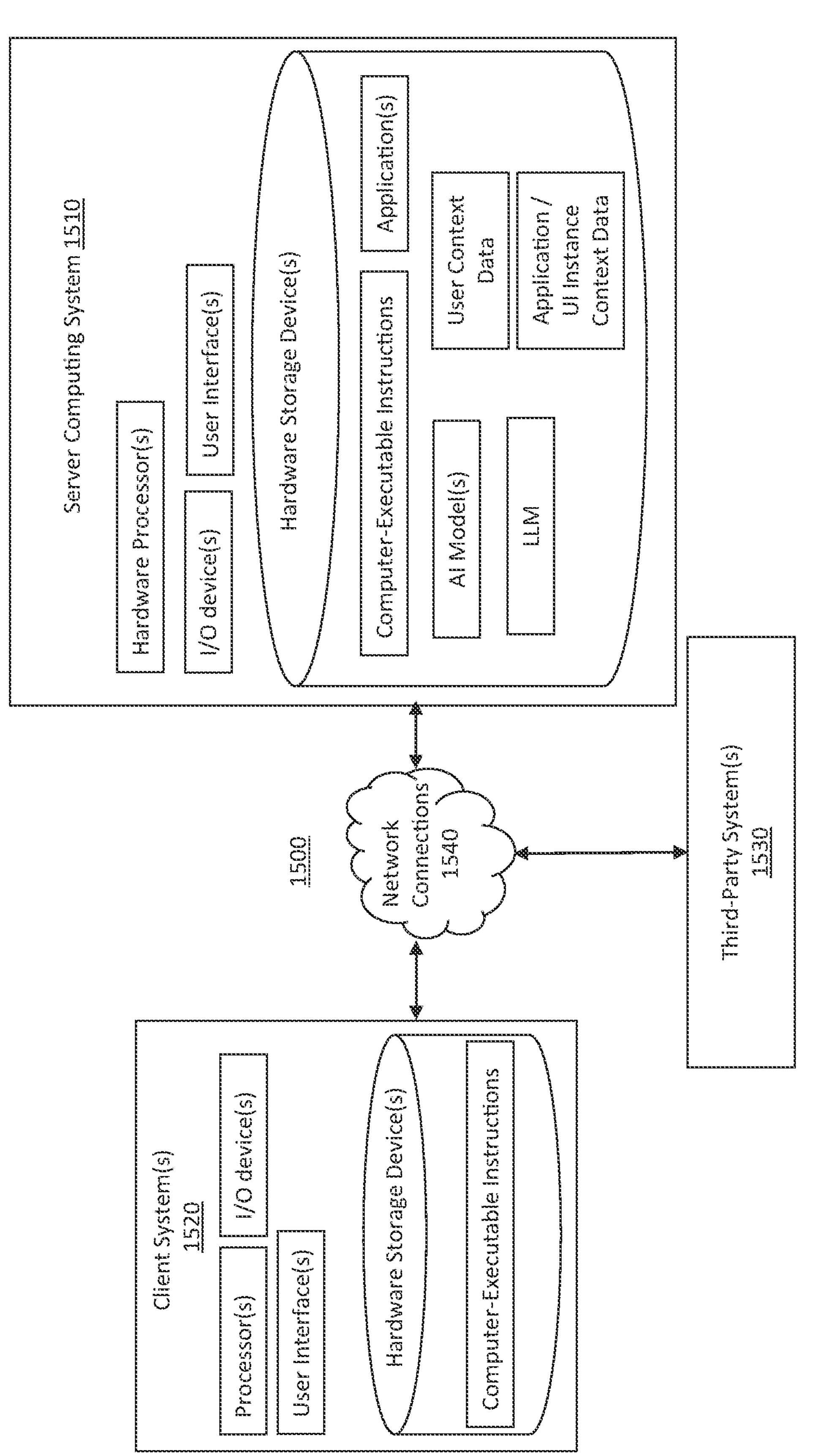
FIG. 15 illustrates an example of a computer system that may be used or incorporated into the disclosed embodiments for utilizing and switching between modes of a multi-modal cursor.

FIG. 15 illustrates an example of a computer system that may be used or incorporated into the disclosed embodiments for utilizing and switching between modes of a multi-modal cursor. This system is an example of two specific-purpose computer systems (e.g., a server computing system and a client system). Each of these systems may be used to implement the functionality described herein. The client system may also include all of the components shown in the server computing system. But they are not duplicated for simplicity and to also show that they may be utilized together as a distributed system.

Embodiments of the disclosure comprise or utilize a general-purpose computer system or a special-purpose computer system (e.g., computer system 1510) that includes computer hardware, such as for example, a processor system (e.g., hardware processor(s)) and system memory, as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network connections 1540) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In some embodiments, computer-executable instructions comprise binaries, intermediate format instructions (e.g., assembly language), or source code. In some embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

Numbered Clauses

The present invention can also be described in accordance with the following numbered clauses.

Clause 1. A computer-implemented method for utilizing a multi-modal cursor and for switching modes of the multi-modal cursor, the method comprising: presenting a user interface with one or more display blocks, each of the one or more display blocks including selectable content; presenting a cursor prompt for a multi-modal cursor within the user interface, the multi-modal cursor being associated with (i) a first cursor mode comprising a non-contextual functionality mode and (ii) a second cursor mode comprising a contextual functionality-enabling mode; presenting both a traditional cursor mode icon and an artificial intelligence (AI) cursor mode icon within the user interface; and determining which mode of the multi-modal cursor to activate and utilize in response to user input selecting either the traditional cursor mode icon or, alternatively, the AI cursor mode icon, wherein user selection of the traditional cursor mode icon causes an activation of the first cursor mode and user selection of the AI cursor mode icon causes activation of the second cursor mode.

Clause 2. The method of clause 1, wherein the traditional cursor mode icon and the artificial intelligence (AI) cursor mode icon are presented simultaneously within the user interface.

Clause 3. The method of clause 1, wherein the method further includes detecting a user selection of the traditional cursor mode icon and determining to continue presenting the cursor prompt in a first format associated with the first cursor mode without changing a presentation of the cursor prompt from the first format to a second format associated with the second cursor mode.

Clause 4. The method of clause 1, wherein the method further includes detecting a user selection of the AI cursor mode icon and determining to change a presentation of the cursor prompt from a first format associated with the first cursor mode to a presentation of the cursor prompt in a second format associated with the second cursor mode.

Clause 5. The method of clause 4, wherein the second format of the cursor prompt associated with the second cursor mode comprises a second shape that is different than one or more first shapes of the cursor prompt associated with the first cursor mode.

Clause 6. The method of clause 1 further comprising: determining a context associated with an instance of the user interface and a context of the user; and determining one or more contextual functions to enable and that will be initiated in response to a subsequent user input selection made of selectable text with the cursor prompt when the cursor prompt is in the second cursor mode, the determination of the one or more contextual functions to enable being based a determined context associated with the instance of the user interface and/or the context of the user.

Clause 7. The method of clause 6, wherein the subsequent user input selection causes different actions to be triggered depending on whether the cursor prompt is in the first cursor mode or the second cursor mode, the method further comprising: (i) in response to detecting the subsequent user input selection with the cursor prompt while the cursor prompt is in the first cursor mode, causing the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, causing the subsequent user input to trigger an interaction with a machine learning model to perform a function associated with the selectable content wherein a selection of the function from a set of different functions is based at least in part on the determined context associated with the instance of the user interface and/or the context of the user.

Clause 8. The method of clause 7, wherein the selectable content comprises text.

Clause 9. The method of clause 7, wherein the selectable content comprises an image.

Clause 10. The method of clause 7, wherein the selectable content comprises a chart or graph.

Clause 11. The method of clause 7, wherein determining the context associated with the instance of the user interface comprises determining a content type of the selectable content presented within the one or more display blocks.

Clause 12. The method of clause 11, wherein determining the context associated with the instance of the user interface further comprises determining a location of the multi-modal cursor within the user interface.

Clause 13. The method of clause 7, wherein determining the context associated with the instance of the user interface further comprises determining the user context.

Clause 14. The method of clause 7, wherein determining the context associated with the instance of the user interface comprises determining one or more applications that are accessible to the user through the interface and one or more functions that can be applied from the one or more applications to the selectable content.

Clause 15. The method of clause 1, wherein the method further comprises displaying a machine-learning model prompt field configured to receive a prompt that the machine-learning model is applied to in response to the prompt being entered into the machine-learning model prompt.

Clause 16. The method of clause 15, the method further comprises causing the machine-learning model to be applied to both the prompt and the selectable content to generate a response based on the prompt and the selectable content.

Clause 17. The method of clause 16, the method further comprising causing the response to be displayed in the user interface.

Clause 18. The method of clause 17, wherein the display of the response replaces the selectable content.

Clause 19. The method of clause 1, the method further comprises detecting new user input selecting the traditional cursor mode icon after the second cursor mode was activated and, responsively, deactivating the second cursor mode and activating the first cursor mode for the cursor prompt.

Clause 20. The method of clause 1, the method further comprises detecting new user input selecting the AI cursor mode icon after the first cursor mode was activated and, responsively, deactivating the first cursor mode and activating the second cursor mode for the cursor prompt.

Clause 21. A system, comprising: a processor system; and a computer storage medium that stores computer-executable instructions that are executable by the processor system to implement a method for utilizing a multi-modal cursor, and by causing the computer system to at least: present a user interface with one or more display blocks, each of the one or more display blocks including selectable content; present a cursor prompt for a multi-modal cursor within the user interface, the multi-modal cursor being associated with (i) a first cursor mode comprising a non-contextual functionality mode and (ii) a second cursor mode comprising a contextual functionality-enabling mode; present both a traditional cursor mode icon and an artificial intelligence (AI) cursor mode icon within the user interface; and determine which mode of the multi-modal cursor to activate and utilize in response to user input selecting either the traditional cursor mode icon or, alternatively, the AI cursor mode icon, wherein user selection of the traditional cursor mode icon causes an activation of the first cursor mode and user selection of the AI cursor mode icon causes activation of the second cursor mode.

Clause 22. The system of clause 21, wherein the traditional cursor mode icon and the artificial intelligence (AI) cursor mode icon are presented simultaneously within the user interface.

Clause 23. The system of clause 21, wherein the computer-executable instructions are further executable by the processor system to cause the system to detect a user selection of the traditional cursor mode icon and determining to continue presenting the cursor prompt in a first format associated with the first cursor mode without changing a presentation of the cursor prompt from the first format to a second format associated with the second cursor mode.

Clause 24. The system of clause 21, wherein the computer-executable instructions are further executable by the processor system to cause the system to detect a user selection of the AI cursor mode icon and determining to change a presentation of the cursor prompt from a first format associated with the first cursor mode to a presentation of the cursor prompt in a second format associated with the second cursor mode.

Clause 25. The system of clause 21, wherein the second format of the cursor prompt associated with the second cursor mode comprises a second shape that is different than one or more first shapes of the cursor prompt associated with the first cursor mode.

Clause 26. The system of clause 21, wherein the computer-executable instructions are further executable by the processor system to cause the system to: determine a context associated with an instance of the user interface and a context of the user; and determine one or more contextual functions to enable and that will be initiated in response to a subsequent user input selection made of the selectable text with the cursor prompt when the cursor prompt is in the second cursor mode, the determination of the one or more contextual functions to enable being based a determined context associated with the instance of the user interface and/or the context of the user.

Clause 27. The system of clause 26, wherein the subsequent user input selection causes different actions to be triggered depending on whether the cursor prompt is in the first cursor mode or the second cursor mode, the computer-executable instructions being further executable by the processor system to cause the system to: (i) in response to detecting the subsequent user input selection with the cursor prompt while the cursor prompt is in the first cursor mode, cause the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, cause the subsequent user input to trigger an interaction with a machine learning model to perform a function associated with the selectable content wherein a selection of the function from a set of different functions is based at least in part on the determined context associated with the instance of the user interface and/or the context of the user.

Clause 28. The system of clause 27, wherein the selectable content comprises text.

Clause 29. The system of clause 27, wherein the selectable content comprises an image.

Clause 30. The system of clause 77, wherein the selectable content comprises a chart or graph.

Clause 31. The system of clause 27, wherein determining the context associated with the instance of the user interface comprises determining a content type of the selectable content presented within the one or more display blocks.

Clause 32. The system of clause 31, wherein determining the context associated with the instance of the user interface further comprises determining a location of the multi-modal cursor within the user interface.

Clause 33. The system of clause 37, wherein determining the context associated with the instance of the user interface further comprises determining the user context.

Clause 34. The system of clause 37, wherein determining the context associated with the instance of the user interface comprises determining one or more applications that are accessible to the user through the interface and one or more functions that can be applied from the one or more applications to the selectable content.

Clause 35. The system of clause 27, wherein the computer-executable instructions are further executable by the processor system to cause the system to display a machine-learning model prompt field configured to receive a prompt that the machine-learning model is applied to in response to the prompt being entered into the machine-learning model prompt.

Clause 36. The system of clause 35, wherein the computer-executable instructions are further executable by the processor system to cause the system to cause the machine-learning model to be applied to both the prompt and the selectable content to generate a response based on the prompt and the selectable content.

Clause 37. The system of clause 36, wherein the computer-executable instructions are further executable by the processor system to cause the system to cause the response to be displayed in the user interface.

Clause 38. The system of clause 37, wherein the display of the response replaces the selectable content.

Clause 39. The system of clause 21, wherein the computer-executable instructions are further executable by the processor system to cause the system to detect new user input selecting the traditional cursor mode icon after the second cursor mode was activated and, responsively, deactivating the second cursor mode and activating the first cursor mode for the cursor prompt.

Clause 40. The system of clause 21, wherein the computer-executable instructions are further executable by the processor system to cause the system to detect new user input selecting the AI cursor mode icon after the first cursor mode was activated and, responsively, deactivating the first cursor mode and activating the second cursor mode for the cursor prompt.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer-implemented method for utilizing a multi-modal cursor and for switching modes of the multi-modal cursor, the method comprising:

presenting a user interface with one or more display blocks, each of the one or more display blocks including selectable content;

presenting a cursor prompt for a multi-modal cursor within the user interface, the multi-modal cursor being associated with (i) a first cursor mode comprising a non-contextual functionality mode and (ii) (ii) a second cursor mode comprising a contextual functionality-enabling mode;

presenting both a traditional cursor mode icon and an artificial intelligence (AI) cursor mode icon concurrently within the user interface; and determining which mode of the multi-modal cursor to activate and utilize in response to user input selecting either the traditional cursor mode icon or, alternatively, the AI cursor mode icon, wherein user selection of the traditional cursor mode icon causes an activation of the first cursor mode and user selection of the AI cursor mode icon causes activation of the second cursor mode, wherein a visual presentation of the cursor prompt in a first format corresponds with the first cursor mode when the traditional cursor mode icon is selected and with a second format corresponding with the second cursor mode when the AI cursor mode icon is selected.

2. The method of claim 1, wherein the method further includes detecting a user selection of the traditional cursor mode icon and determining to continue presenting the cursor prompt in a first format associated with the first cursor mode without changing a presentation of the cursor prompt from the first format to a second format associated with the second cursor mode.

3. The method of claim 1, wherein the method further includes detecting a user selection of the AI cursor mode icon and determining to change a presentation of the cursor prompt from a first format associated with the first cursor mode to a presentation of the cursor prompt in a second format associated with the second cursor mode.

4. The method of claim 3, wherein the second format of the cursor prompt associated with the second cursor mode comprises a second shape that is different than one or more first shapes of the cursor prompt associated with the first cursor mode.

5. The method of claim 1 further comprising:

determining a context associated with an instance of the user interface and a context of the user; and determining one or more contextual functions to enable and that will be initiated in response to a subsequent user input selection made of selectable text with the cursor prompt when the cursor prompt is in the second cursor mode, the determination of the one or more contextual functions to enable being based a determined context associated with the instance of the user interface and/or the context of the user.

6. The method of claim 5, wherein the subsequent user input selection causes different actions to be triggered depending on whether the cursor prompt is in the first cursor mode or the second cursor mode, the method further comprising:

(i) in response to detecting the subsequent user input selection with the cursor prompt while the cursor prompt is in the first cursor mode, causing the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, causing the subsequent user input to trigger an interaction with a machine learning model to perform a function associated with the selectable content wherein a selection of the function from a set of different functions is based at least in part on the determined context associated with the instance of the user interface and/or the context of the user.

7. The method of claim 6, wherein the selectable content comprises text.

8. The method of claim 6, wherein the selectable content comprises an image.

9. The method of claim 6, wherein the selectable content comprises a chart or graph.

10. The method of claim 6, wherein determining the context associated with the instance of the user interface comprises determining a content type of the selectable content presented within the one or more display blocks.

11. The method of claim 10, wherein determining the context associated with the instance of the user interface further comprises determining a location of the multi-modal cursor within the user interface.

12. The method of claim 6, wherein determining the context associated with the instance of the user interface further comprises determining the user context.

13. The method of claim 6, wherein determining the context associated with the instance of the user interface comprises determining one or more applications that are accessible to the user through the interface and one or more functions that can be applied from the one or more applications to the selectable content.

14. The method of claim 1, wherein the method further comprises displaying a machine-learning model prompt field configured to receive a prompt that the machine-learning model is applied to in response to the prompt being entered into the machine-learning model prompt.

15. The method of claim 14, the method further comprises causing the machine-learning model to be applied to both the prompt and the selectable content to generate a response based on the prompt and the selectable content.

16. The method of claim 15, the method further comprising causing the response to be displayed in the user interface.

17. The method of claim 16, wherein the display of the response replaces the selectable content.

18. The method of claim 1, the method further comprises detecting new user input selecting the traditional cursor mode icon after the second cursor mode was activated and, responsively, deactivating the second cursor mode and activating the first cursor mode for the cursor prompt.

19. The method of claim 1, the method further comprises detecting new user input selecting the AI cursor mode icon after the first cursor mode was activated and, responsively, deactivating the first cursor mode and activating the second cursor mode for the cursor prompt.

* * * * *